(12) United States Patent
Verma et al.

(10) Patent No.: US 12,743,639 B2
(45) Date of Patent: Sep. 22, 2026

(54) VOICE AI CONTAINER

(71) Applicant: Bank of America Corporation, Charlotte, NC (US)

(72) Inventors: Sandeep Verma, Gurugram (IN); Nandini Rathaur, Mumbai (IN); Amit Mishra, Chennai (IN); Srinivas Dundigalla, Waxhaw, NC (US); Pavan Chayanam, Alamo, CA (US)

(73) Assignee: Bank of America Corporation, Charlotte, NC (US)

( * ) Notice: Subject to any disclaimer, the term of this patent is extended or adjusted under 35 U.S.C. 154(b) by 683 days.

(21) Appl. No.: 18/208,912

(22) Filed: Jun. 13, 2023

(65) Prior Publication Data

US 2024/0419983 A1 Dec. 19, 2024

(51) Int. Cl.

| | |
|---|---|
| ***G06N 5/022*** | (2023.01) |
| ***G06F 16/2457*** | (2019.01) |
| ***G06F 16/25*** | (2019.01) |
| ***H04M 3/51*** | (2006.01) |

(52) U.S. Cl.

CPC ....... *G06N 5/022* (2013.01); *G06F 16/24575* (2019.01); *G06F 16/25* (2019.01); *H04M 3/5166* (2013.01)

(58) Field of Classification Search

USPC ...................................................... 704/1–504

See application file for complete search history.

(56) References Cited

U.S. PATENT DOCUMENTS

| | | | | |
|---|---|---|---|---|
| 10,418,032 | B1 * | 9/2019 | Mohajer | G10L 15/1815 |
| 11,115,530 | B1 * | 9/2021 | Andar | H04M 3/4936 |
| 11,196,863 | B2 * | 12/2021 | Spohrer | G06N 3/006 |
| 11,238,843 | B2 * | 2/2022 | Arik | G10L 13/08 |
| 2015/0142704 | A1 * | 5/2015 | London | G10L 15/1822 706/11 |
| 2018/0314689 | A1 * | 11/2018 | Wang | G10L 15/1822 |
| 2020/0076947 | A1 * | 3/2020 | Deole | H04M 3/527 |
| 2020/0274969 | A1 * | 8/2020 | Dunn | G06F 16/3329 |
| 2022/0174153 | A1 * | 6/2022 | Spohrer | G06N 20/00 |
| 2023/0026945 | A1 * | 1/2023 | Friedlander | G06N 3/045 |
| 2024/0419983 | A1 * | 12/2024 | Verma | H04M 3/5166 |

FOREIGN PATENT DOCUMENTS

| | | |
|---|---|---|
| WO | WO2021/160191 | 8/2021 |

* cited by examiner

*Primary Examiner* — Marcus T Riley
(74) *Attorney, Agent, or Firm* — Weiss & Arons LLP

(57) ABSTRACT

Methods are provided for an artificial intelligence ("AI") agent answering a call within a voice AI container. The methods may include the AI agent receiving the call from a human caller within the voice AI container, the call may include a query. The methods may include parsing the query to identify context associated with the query. The methods may include identifying using the context an intent of the query. The methods may include determining whether a first valid mapping stored within a backend database, located in the voice AI container, is associated with the intent of the query. The methods may include loading the first valid mapping. The methods may include navigating an agent screen using the loaded valid mapping. The methods may include gathering information required to satisfy the intent of the query. The methods may include relaying the information to the human caller.

16 Claims, 6 Drawing Sheets

VOICE AI CONTAINER

FIELD OF TECHNOLOGY

Aspects of the disclosure relate to technology for improving customer service via voice calls.

BACKGROUND OF THE DISCLOSURE

Many companies have a need to provide customer service to their customers. Customers may call the company to request a service or information. These companies may set-up offices or call centers and provide agents to service the customer's needs. Some larger companies receive too many calls for all the agents to service the customer.

Therefore, artificial intelligence ("AI") agents were created to answer some of the volume of calls the call center receives. The AI agents alleviate the burden on the human agents. AI agents use a variety of techniques to discern the meaning of the caller and respond appropriately to the customer.

However, the AI agents may not always be able to discern the meaning of the caller and respond appropriately to the customer. The customer may also desire to speak with a human agent rather than an AI agent. Typically, in such instances the caller is transferred to the human agent for the duration of the call.

It would be desirable to limit the number of calls directed to the human agent. It would be further desirable to enable a machine to answer all the customer's queries while giving the customer a human agent interactive experience.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
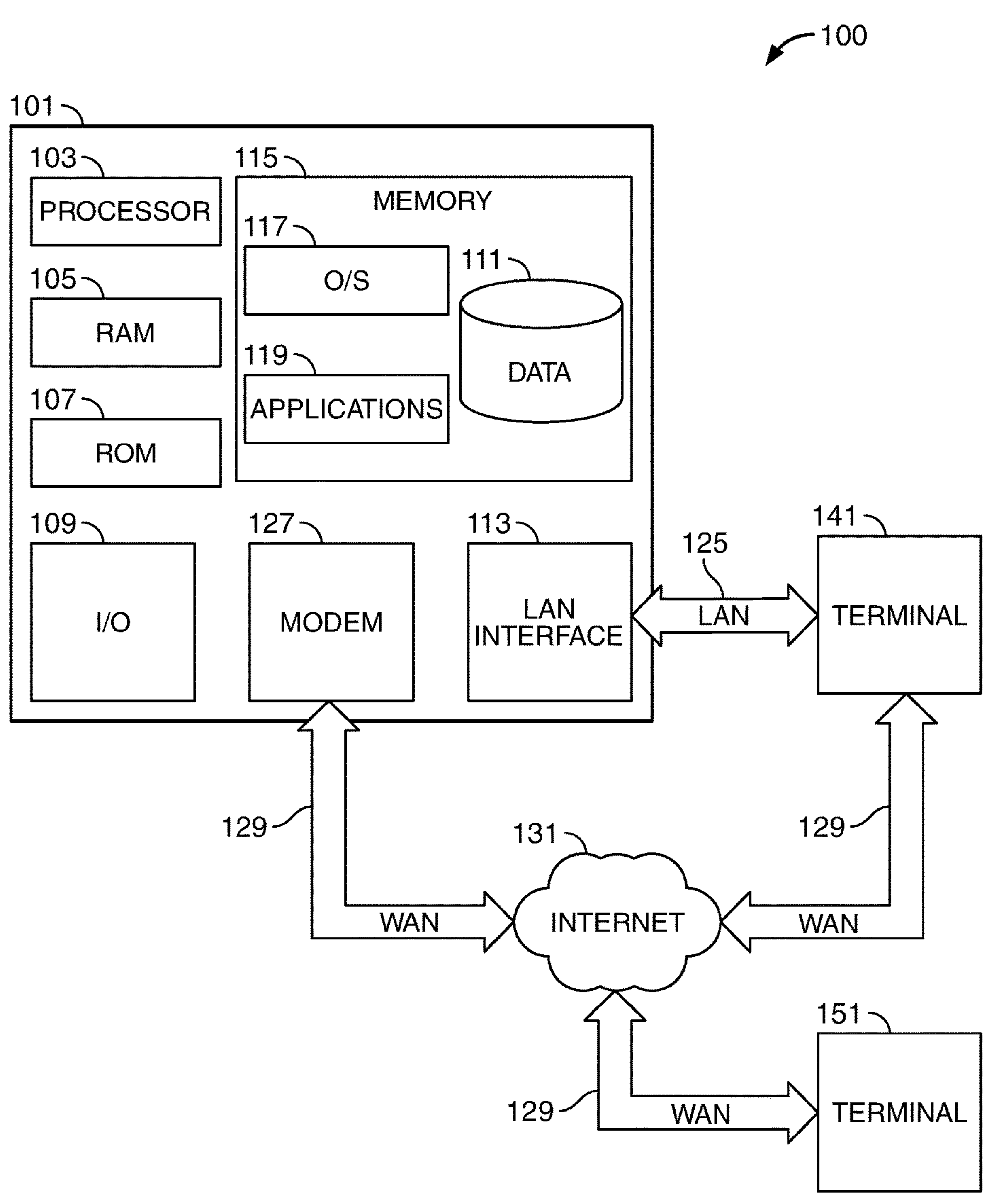
FIG. 1 shows an illustrative apparatus in accordance with principles of the disclosure.

Methods are provided to enable an artificial intelligence ("AI") agent to answer a call within a voice AI container. The AI agent may include a chatbot or an equivalent computer program thereof. The methods may include computer programs to provide for the method steps. The computer programs may include executable instructions stored on non-transitory memory of a computer system.

The voice AI container includes packages of software that contain within them all the elements needed to run the software. The voice AI container as disclosed herein may contain all the elements for the AI agent to retrieve answers to the questions the customer asks. All databases, applications, agents, and developers are located or are active within the voice AI container. The voice AI container does not require any information or instructions from outside of the container. The voice AI container may be stored and run on hardware which is physical, or a combination of physical and virtual. The physical hardware may include a server.

Methods may include receiving the call from a human caller within a voice AI container. The call may include a query from the human caller. The query may include context. The query may be associated with the human caller's personal account. The query and context may include an intent of the call.

The query may be in the form of a voice input from the human caller. However, it is also contemplated that the query may be in the form of a text input or other means of inputting information. The AI agent may be programmed to process the voice inputs from the human caller using natural language processing ("NLP"). Human callers may compose a query in many possible ways. For example, the human caller can say "I want my account balance", "what is my balance" or "tell me how much money I have" etc. While the previous queries are worded differently, an intent of the call may be the same. For example, —retrieve account balance—. The AI agent may be programmed to identify the intent of the call.

There is much data that is currently not being captured during user interaction with an AI agent. The context may provide for some of the uncaptured information. The context of the query is an important factor in determining the intent of the call. The context of the query may include a content of the query and at least one of: a time the call was placed, a location from which the call was placed, a history of previous calls placed by the same caller, grammar and syntax of the query, a language which was used by the human caller, a pace that the human caller was speaking, an amount of words the human caller used for the query and a tone of the human caller.

Methods may include the AI agent parsing the query to identify the context associated with the query. The AI agent may identify the intent of the call using the content of the query and any other relevant context parsed from the query. The AI agent may then communicate with a backend database, located within the voice AI container, to determine if there is a valid mapping, stored in the backend database, that is associated with the intent of the call.

A mapping may be determined to be a valid mapping by comparing the identified intent of the call with a plurality of intents of the call stored in the backend database. The stored intent of the call, which has the highest matching percentage and achieves a predetermined matching threshold, is established as matching the identified intent of the call. The mapping associated with the matching stored intent of the call may be determined to be a valid mapping. If the comparison does not achieve the predetermined matching threshold, there is no matching intent of the call and no valid mapping. The comparing may be performed by any known comparison program, such as programs utilizing text similarity technology. The matching threshold may be any threshold known in the art and may be for example 90% or higher.

The valid mapping may include a set of steps taken to gather the information requested by the human caller. The set of steps may include loading an automated screen navigation script. The automated screen navigation script may include instructions for an agent software, located within the voice AI container, to navigate to specific screens in a specific order on an agent computer, located within the voice AI container, to gather the information located on each respective screen needed to satisfy the intent of the call.

Methods may include the AI agent determining that a valid mapping for the intent of the call exists. Upon determination that the valid mapping exists the AI agent may load the valid mapping. The loaded valid mapping may automatically navigate the agent computer to different screens containing information relevant to satisfy the intent of the call. The information may be relayed to the human caller.

The human caller may prefer that a human agent relays the information. A human agent relaying the information may provide an enhanced customer service experience. The human caller may desire an interactive experience with the agent taking the human caller's call. The AI agent may relay information to the human caller using a human agent's speech and voice pattern to enhance the customer service experience.

Methods may include the AI agent identifying a human agent that is actively assigned to the voice AI container. The AI agent may load an agent voice and speech profile associated with the human agent that is actively assigned to the voice AI container. The AI agent may relay the information to the human caller using the agent voice and speech profile.

The agent voice and speech profile may be created using any known voice cloning software. The voice cloning software may record voice samples from the human agent. The voice samples may be recorded during a call with a customer or may be recorded separately by the human agent. The voice samples may be of a sufficient duration to properly assess a voice and speech pattern associated with the human agent. The voice and speech pattern may be used to create the agent voice and speech profile. The agent voice and speech profile may be associated with the human agent. The agent voice and speech profile may be stored within an agent speech profile database located within the voice AI container.

Methods may include a plurality of valid mappings stored in the backend database located within the voice AI container. Each of the plurality of valid mappings may be associated with one of a plurality of intents of a call from a human caller. Each of the plurality of valid mappings may be preprogrammed into the backend database or may be created by using data provided by a machine learning ("ML") agent.

The plurality of valid mappings may be preprogrammed into the backend database by developers active within the voice AI container. The developers may create a valid mapping by anticipating an intent of the call and writing an AI use case to allow the AI agent or ML agent to satisfy the intent of the call. The AI use case may be a set of steps taken by the AI agent to satisfy the intent of the call.

The plurality of valid mappings may be created by using data provided by a machine learning agent present within the voice AI container. The machine learning agent may identify an intent of the call. The machine learning agent may identify information needed to satisfy the intent of the call. The machine learning agent may proceed to gather the information needed to satisfy the intent of the call. The machine learning agent may gather the information by instructing an agent software, located within the voice AI container, to navigate to specific screens in a specific order on an agent computer, located within the voice AI container, to gather the information, located on each respective screen, needed to satisfy the intent of the call.

The navigation through the specific screens in the specific order and the information needed from each screen may be captured as agent screen navigation data. The agent screen navigation data may be associated with the intent of the call identified by the machine learning agent. An automated screen navigation script may be created using the agent screen navigation data and the associated intent of the call. The automated screen navigation script may include instructions for an agent software, located within the voice AI container, to navigate to specific screens in a specific order on an agent computer, located within the voice AI container, to gather the information located on each respective screen needed to satisfy the intent of the call. The automated screen navigation script may be used to create one of the plurality of valid mappings. The newly created valid mapping may be stored in the backend database.

Methods may include updating the backend database to associate the query and the context associated with the query to an intent of the call and associated valid mapping. Updating the backend database may allow for the AI agent to identify the intent of the call more readily in a future call.

Methods may include receiving the call from a human caller within a voice AI container. The call may include a query from the human caller. The query may include context. The query may be associated with the human caller's personal account. The account may be an account within the entity of the voice AI container. The query and context may include an intent of the call.

Methods may include the AI agent parsing the query to identify the context associated with the query. The AI agent may identify the intent of the call using the content of the query and any relevant context parsed from the query. The AI agent may then communicate with a backend database, within the voice AI container, to determine if there is a valid mapping, stored in the backend database, that is associated with the intent of the call.

Methods may include the AI agent determining that a first valid mapping for the intent of the call does not exist within the backend database. Upon determination that the first valid mapping does not exist the AI agent may identify a machine learning agent that is actively assigned to the voice AI container. The AI agent may pass control of the call to the machine learning agent. The machine learning agent may respond to the human caller.

The AI agent determines if a first valid mapping exists by comparing the identified intent of the call with a plurality of intents of the call stored in the backend database. The stored intent of the call, which has the highest matching percentage and achieves a predetermined matching threshold, is established as matching the identified intent of the call. When the predetermined matching threshold is not achieved a first valid mapping does not exist. The first valid mapping may be an AI agent determined valid mapping.

The machine learning agent is present in the voice AI container and does not require context passing when the call is transferred as the machine learning agent is already present in the session, which may provide for a fluid and seamless transfer. The machine learning agent may be better suited to identify the context of the query and thus the intent of the call. The machine learning agent may be better suited to determine which valid mapping is associated with the intent of the call identified. The machine learning agent may understand the intent of the call and know how to navigate to different agent screens to gather information required by the intent of the call, without the valid mapping. The machine learning agent may have increased processing power relative to the AI agent.

Methods may include the machine learning agent responding to the human caller by determining that a second valid mapping for the intent of the call does exist. Upon determination that the second valid mapping exists the machine learning agent may transfer control back to the AI agent along with the second valid mapping to respond to the call. The query, context of the query and intent of the call may be updated to be associated with the second valid mapping.

The machine learning agent may determine if a second valid mapping exists by performing its own comparison. The second valid mapping may be a machine learning agent determined valid mapping. The comparison performed by the machine learning agent may be more comprehensive than the comparison performed by the AI agent. The machine learning agent may re-evaluate the context and intent of the call, for example, with a more comprehensive NLP program, to perform the comparison. The machine learning agent may use a text similarity program that is more comprehensive than the one used by the AI agent to perform the comparison. The more comprehensive comparison performed by the machine learning agent may achieve the predetermined matching threshold and a second valid mapping may be determined to exist.

The call may be transferred back to the AI agent from the machine learning agent with the second valid mapping. The AI agent may load the second valid mapping. The loaded valid mapping may automatically navigate to different screens on the agent computer containing information relevant to satisfy the intent of the call. The information may be gathered and relayed to the human caller.

The human caller may prefer that a human agent relays the information. A human agent relaying the information may provide an enhanced customer service experience. The human caller may desire an interactive experience with the agent taking the human caller's call. The AI agent may relay information to the human caller using a human agent's speech and voice pattern to enhance the customer service experience.

Methods may include the AI agent identifying a current human agent that is actively assigned to the voice AI container. The AI agent may load an agent voice and speech profile associated with the human agent that is actively assigned to the voice AI container. The AI agent may relay the information to the human caller using the agent voice and speech profile.

Methods may alternatively include the machine learning agent responding to the human caller by identifying the information required by the intent of the call. The machine learning agent may navigate to different screens in a specific order on the agent computer containing the information relevant to satisfy the intent of the call. The machine learning agent may gather the information and relay the information to the human caller.

Methods may include capturing the navigation through the specific screens in the specific order and the information needed from each screen as agent screen navigation data. The agent screen navigation data may be associated with the intent of the call. The agent screen navigation data and the associated intent of the call may be used to create an automated screen navigation script. The automated screen navigation script may include instructions for an agent software, located within the voice AI container, to navigate to specific screens in a specific order on an agent computer, located within the voice AI container, to gather the information located on each respective screen needed to satisfy the intent of the call. The automated screen navigation script and the associated intent of the call may be used to create a third valid mapping. The third valid mapping may be associated with the query, context of the query and intent of the call. The third valid mapping may be stored in the backend database.

The voice AI container may have a human agent assigned to be active within the container. A call between the human caller and the AI/ML agent may require a human agent to supervise the call. The human agent may be able to multitask while supervising the call in the voice AI container. For example, the human agent can be present within the voice AI container in a passive capacity. In the passive capacity the human agent can chat with a second customer, read and respond to an email from a third customer and be ready to switch to an active capacity and take control of the call from the AI/ML agent.

The call between the human caller and the AI/ML agent may require the human agent to take control of the call. The human agent may take control of the call when the AI/ML agent cannot identify the intent of the call, find/create a valid mapping to satisfy the intent of the call or satisfy the customer. The human agent is present in the voice AI container and does not require context passing when the call is transferred as the human agent is already present in the session, which may provide for a fluid and seamless transfer. The AI agent may be using the human agent's voice and speech profile before the transfer which adds to the fluid and seamless nature of the transfer.

The voice AI container may be stored on a server. The server may be a computer server. The server may be a network connected computer system. Computer servers, as disclosed herein, may include a processor circuit. The processor circuit may control overall operation of the server and its associated components. The processor circuit may include hardware, such as one or more integrated circuits that form a chipset. The hardware may include digital or analog logic circuitry configured to perform any suitable (e.g., logical) operation.

For example, a server may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning algorithms, AI algorithms, or any other suitable information or data structures. Components of the server may be linked by a system bus, wirelessly or by other suitable interconnections. System components may be present on one or more circuit boards. In some embodiments, the components may be integrated into a single chip. The chip may be silicon-based.

The server may include RAM, ROM, an input/output ("I/O") module and a non-transitory or non-volatile memory. The I/O module may include a microphone, button and/or touch screen which may accept user-provided input. The I/O module may include one or more speakers for providing audio output and a video display for providing textual, audiovisual and/or graphical output.

Software applications may be stored within the non-transitory memory and/or other storage medium. Software applications may provide instructions to the processor that enable the server to perform various functions. For example, the non-transitory memory may store software applications such as operating systems, application programs, and an associated database. Some or all of the computer executable instructions of the server may be embodied in hardware or firmware components of the server.

The server may include cloud computing and virtualization implementations of software. Such implementations may be designed to run on a physical server supplied externally by a hosting provider, a client, or other virtualized platform.

Software application programs, which may be used by the server, may include computer executable instructions for invoking user functionality related to communication, such as email, short message service ("SMS"), and voice input and speech recognition applications. Software application programs may utilize one or more algorithms that formulate predictive machine responses, formulate database queries, process human caller inputs, process human agent inputs, or any other suitable tasks.

A server may include a communication circuit. The communication circuit may include a network interface card or adapter. When used in a WAN networking environment, apparatus may include a modem, antenna, or other circuitry for establishing communications over a WAN, such as the Internet. The communication circuit may include a modem and/or antenna. The existence of any of various well-known protocols such as TCP/IP, Ethernet, FTP, HTTP, and the like is presumed, and the server may be operated in a client-server configuration to permit retrieval of web pages from a web-based server. Web browsers can be used to display and manipulate data on web pages.

A server may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A server may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones, multiprocessor systems, minicomputer systems, microprocessor systems, mainframe computers, distributed computing environments that include any of the above systems or devices, and the like.

A server may utilize computer-executable instructions, such as program modules, executed by a processor. Generally, program modules include routines, programs, objects, components, data structures, etc. that perform particular tasks or implement abstract data types. A server may be operational with distributed computing environments where tasks are performed by remote processing devices that are linked through a communications network. In a distributed computing environment, program modules may be located in both local and remote computer storage media including memory storage devices. A server may rely on a network of remote servers hosted on the Internet to store, manage, and process data (e.g., "cloud computing" and/or "fog computing").

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computer system" or "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101, e.g., the operating system 117 and applications 119 such as an automatic data layering program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an automatic data layering program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology e.g., a hard drive or other non-transitory memory. The memory may store software including an operating system and any application(s) (such as an automatic data layering program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refers to applications located on a server remote from a user, wherein some or all the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an automatic data layering program and security protocols, as well as other programs. In an embodiment, one or more programs, or aspects of a program, may use one or more AI/IL algorithm(s). The various tasks may be related to analyzing and categorizing various data to layer the data according to levels of access.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
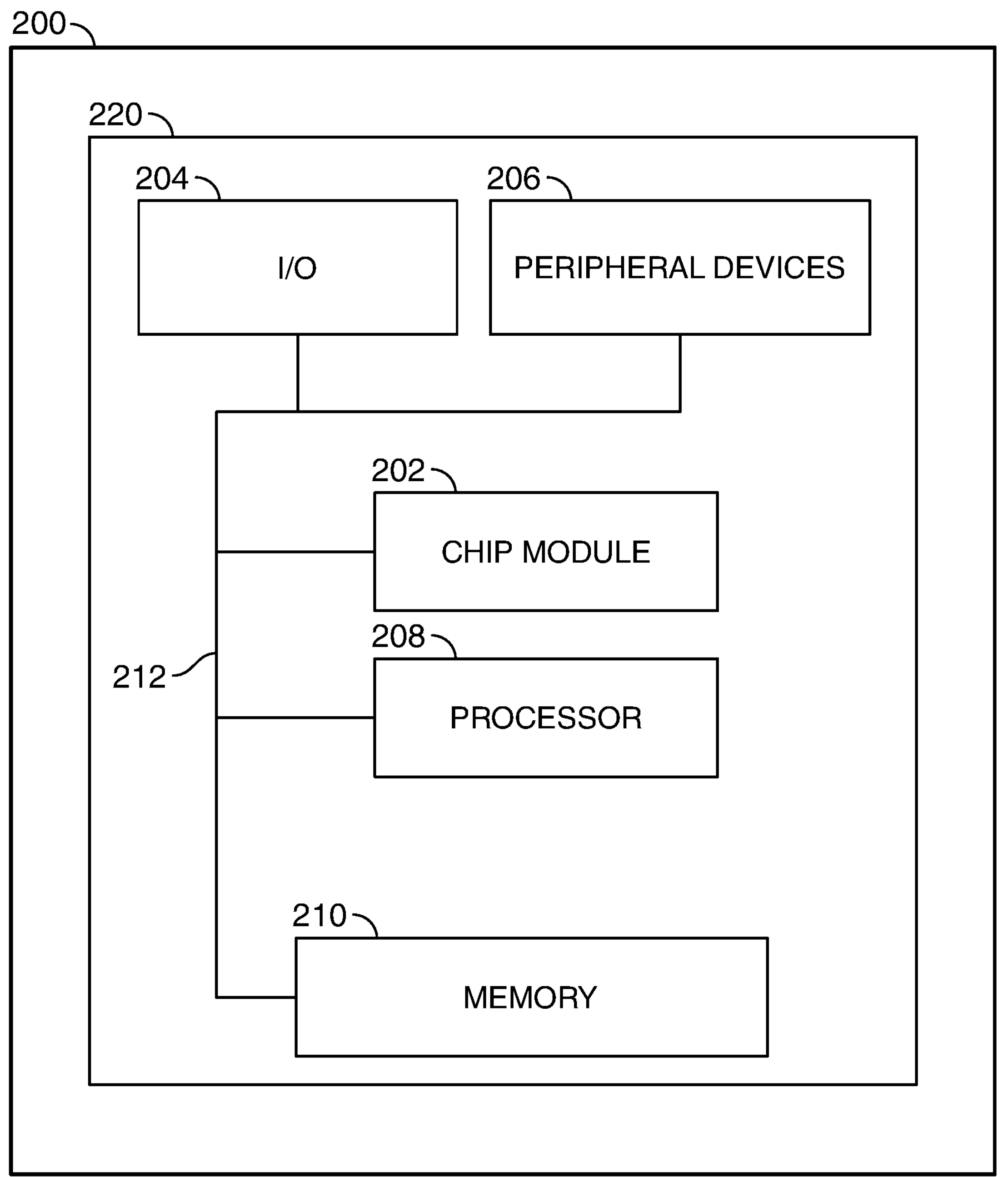
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
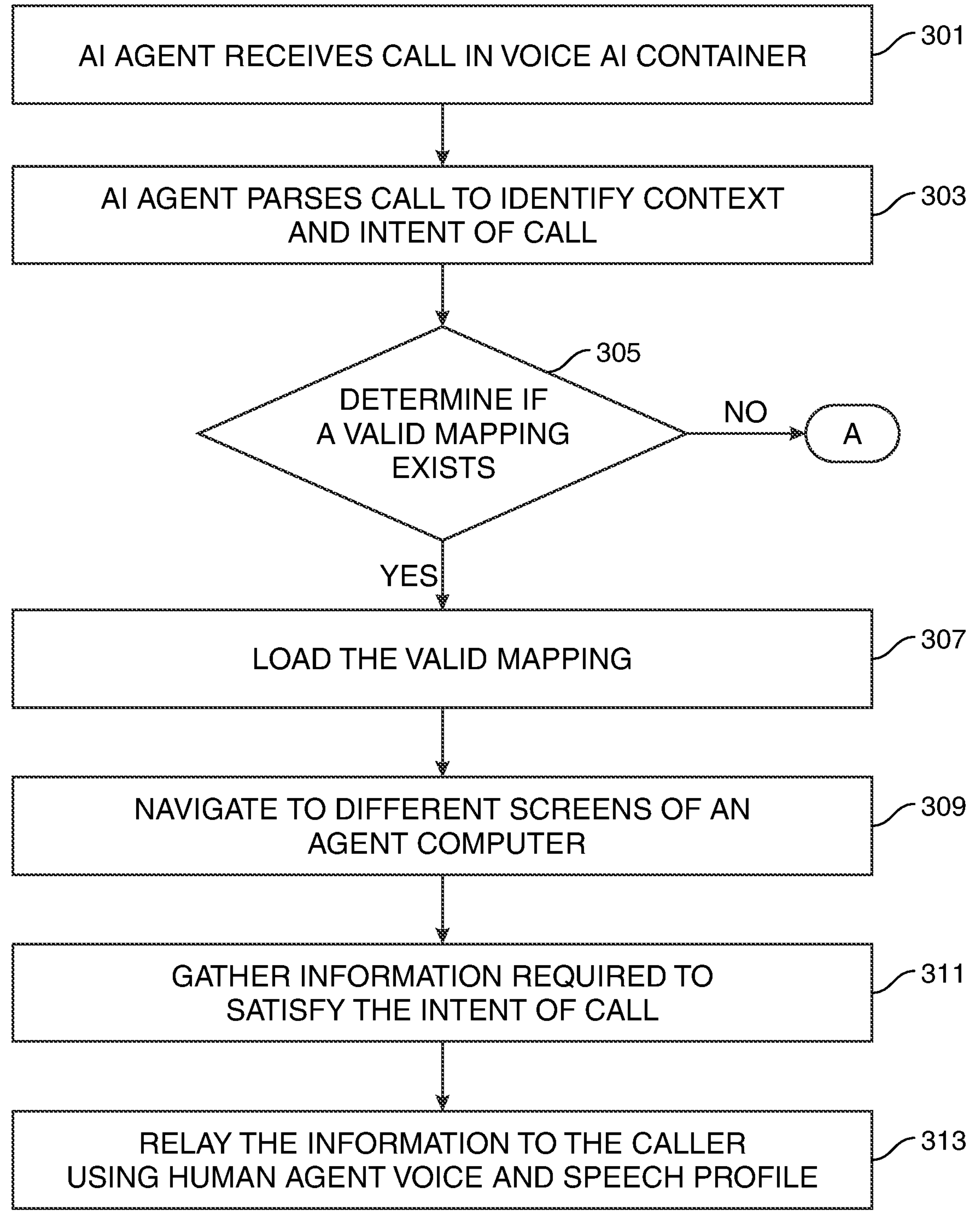
FIG. 3 shows an illustrative flowchart in accordance with principles of the disclosure.
Figure 4:
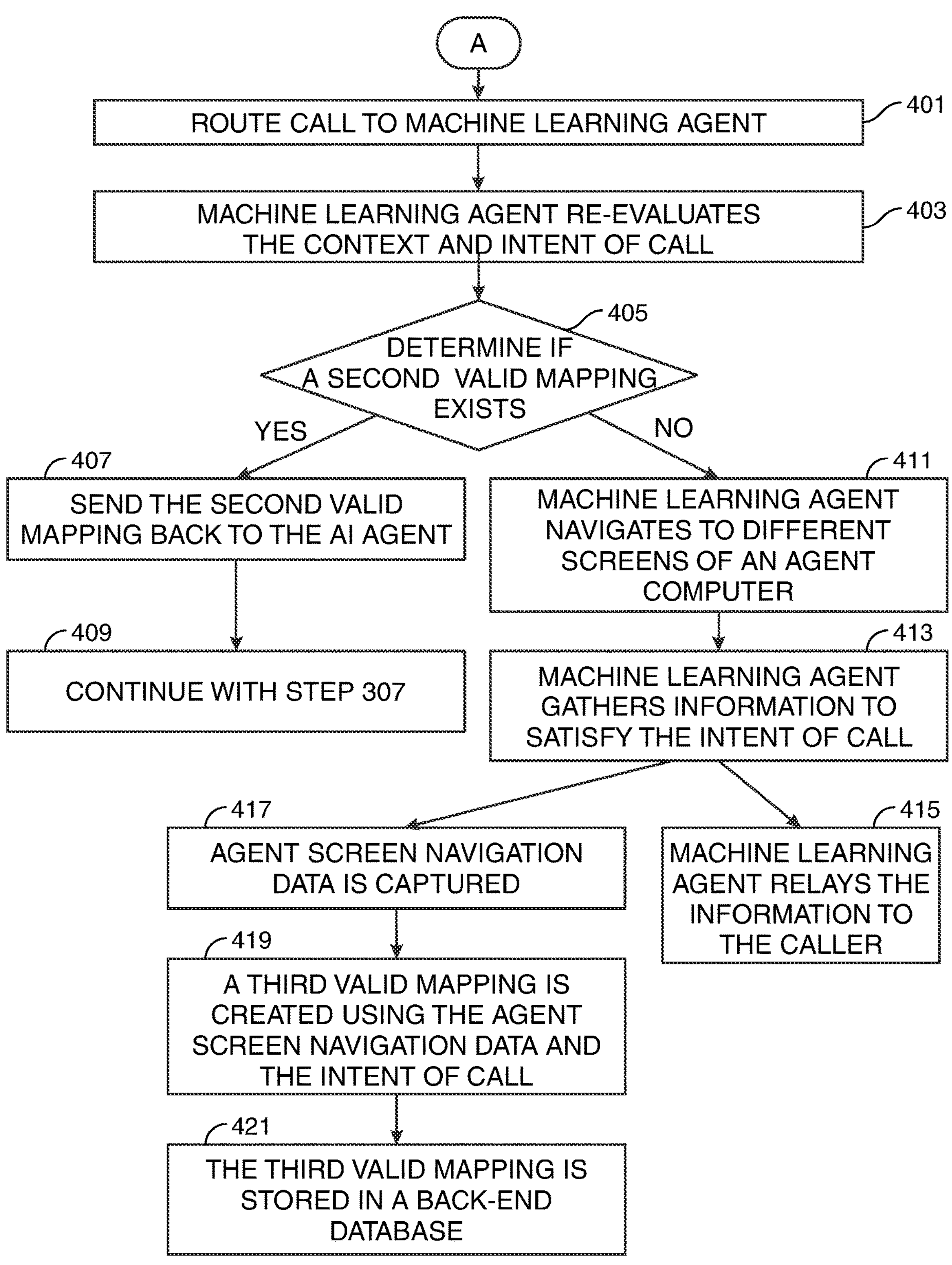
FIG. 4 shows an illustrative flowchart in accordance with principles of the disclosure.

FIGS. 3 and 4 show an illustrative flow chart in accordance with principles of the disclosure. In FIG. 3, at step 301, methods may include receiving a call from a human caller within the voice AI container. The call may be answered by an AI agent. The call may include a query from the human caller. At step 303, methods may include the AI agent parsing the call to identify a context of the call and using the query and context of the call to identify an intent of the call.

At step 305, methods may include the AI agent determining if a first valid mapping associated with the intent of the call exists. The valid mapping may be an AI agent determined valid mapping. The AI agent determines if a first valid mapping exists by comparing the identified intent of the call with a plurality of intents of the call stored in the backend database. The stored intent of the call, which has the highest matching percentage and achieves a predetermined matching threshold, is established as matching the identified intent of the call. When the predetermined matching threshold is not achieved a first valid mapping does not exist. The first valid mapping may be an AI agent determined valid mapping. If the valid mapping does exist the methods may continue with step 307, if the valid mapping does not exist the methods may follow A and continue in FIG. 4.

At step 307, methods may include the AI agent loading the valid mapping. At step 309, the methods may include the valid mapping, loaded in step 307, automatically navigating to different screens of an agent computer. At step 311, the methods may include, during the navigation step 309, gathering information required to satisfy the intent of the call. At step 313, the information gathered in step 311 is relayed to the human caller using an agent voice and speech profile.

In FIG. 4, at step 401, methods may include upon the determination that a first valid mapping does not exist the call may be routed to a machine learning agent. The machine learning agent may be associated with the voice AI container. At step 403, methods include the machine learning agent re-evaluating the context and the intent of the call. At step 405, methods may include the machine learning agent determining if a second valid mapping associated with the intent of the call, determined in step 403, exists. The second valid mapping may be a machine learning agent determined valid mapping. The machine learning agent may determine if a second valid mapping exists by performing its own comparison. The second valid mapping may be a machine learning agent determined valid mapping. The comparison performed by the machine learning agent may be more comprehensive than the comparison performed by the AI agent. The machine learning agent may re-evaluate the context and intent of the call, for example, with a more comprehensive NLP program, to perform the comparison. The machine learning agent may use a text similarity program that is more comprehensive than the one used by the AI agent to perform the comparison. The more comprehensive comparison performed by the machine learning agent may achieve the predetermined matching threshold and a second valid mapping may be determined to exist. If the second valid mapping does exist the methods may continue with step 407, if the second valid mapping does not exist the methods may continue with step 411. At step 407, methods may include transferring the call with the second valid mapping back to the AI agent. At step 409, methods may include continuing the methods at step 307 with loading the second valid mapping.

Methods may include the machine learning agent able to identify information needed to satisfy the intent of the call. At step 411, methods may include the machine learning agent navigating to different screens of an agent computer. At step 413, methods may include gathering the information, identified by the machine learning agent, from the screens navigated to during step 411. At step 415, methods may include the machine learning agent relaying the information gathered in step 413 to the human caller.

Methods may include creating a new valid mapping. At step 417, methods may include capturing agent screen navigation data during steps 411 and 413. At step 419, methods may include creating a third valid mapping using the agent screen navigation data, captured during step 417, the query, context of the query and intent of the call identified in steps 303 and 403. At step 421, methods may include storing the third valid mapping in a backend database within the voice AI container.

Figure 5:
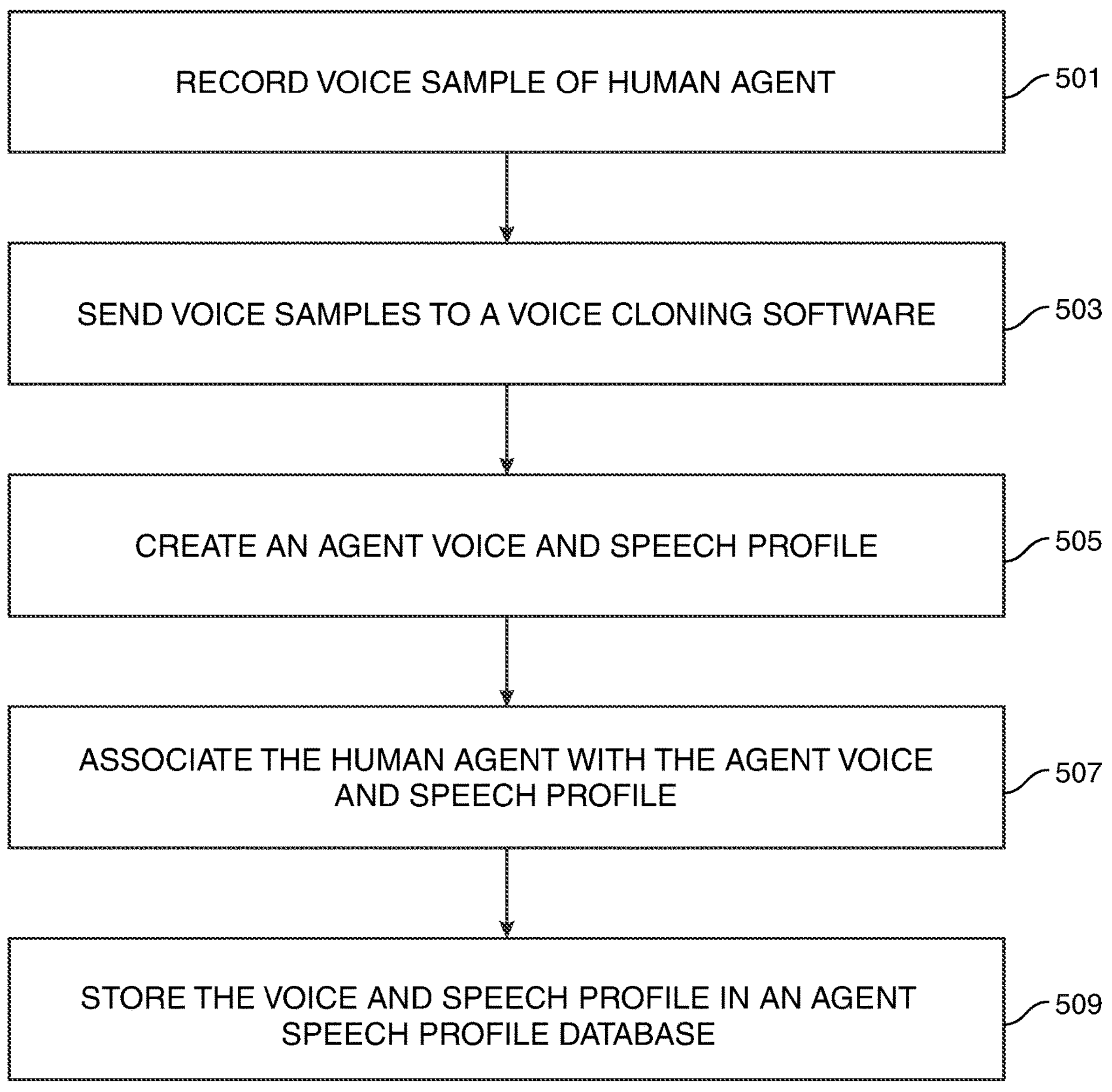
FIG. 5. shows an illustrative flowchart in accordance with principles of the disclosure.

FIG. 5, shows an illustrative flow chart of the process for creating an agent voice and speech profile, which may be utilized in, for example, step 313. At step 501, methods may include recording voice samples from a human agent. The voices samples may be recorded during a call with a customer or may be recorded separately. At step 503, methods may include sending the voice samples, recorded in step 501, to a voice cloning software. At step 505, methods may include the voice cloning software creating an agent voice and speech profile using the received voice samples in step 503.

At step 507, methods may include associating the human agent with the agent voice and speech profile created in step 505. At step 509, methods may include storing the voice and speech profile, created in step 505, and associated with the human agent in step 507, in an agent speech profile database.

Figure 6:
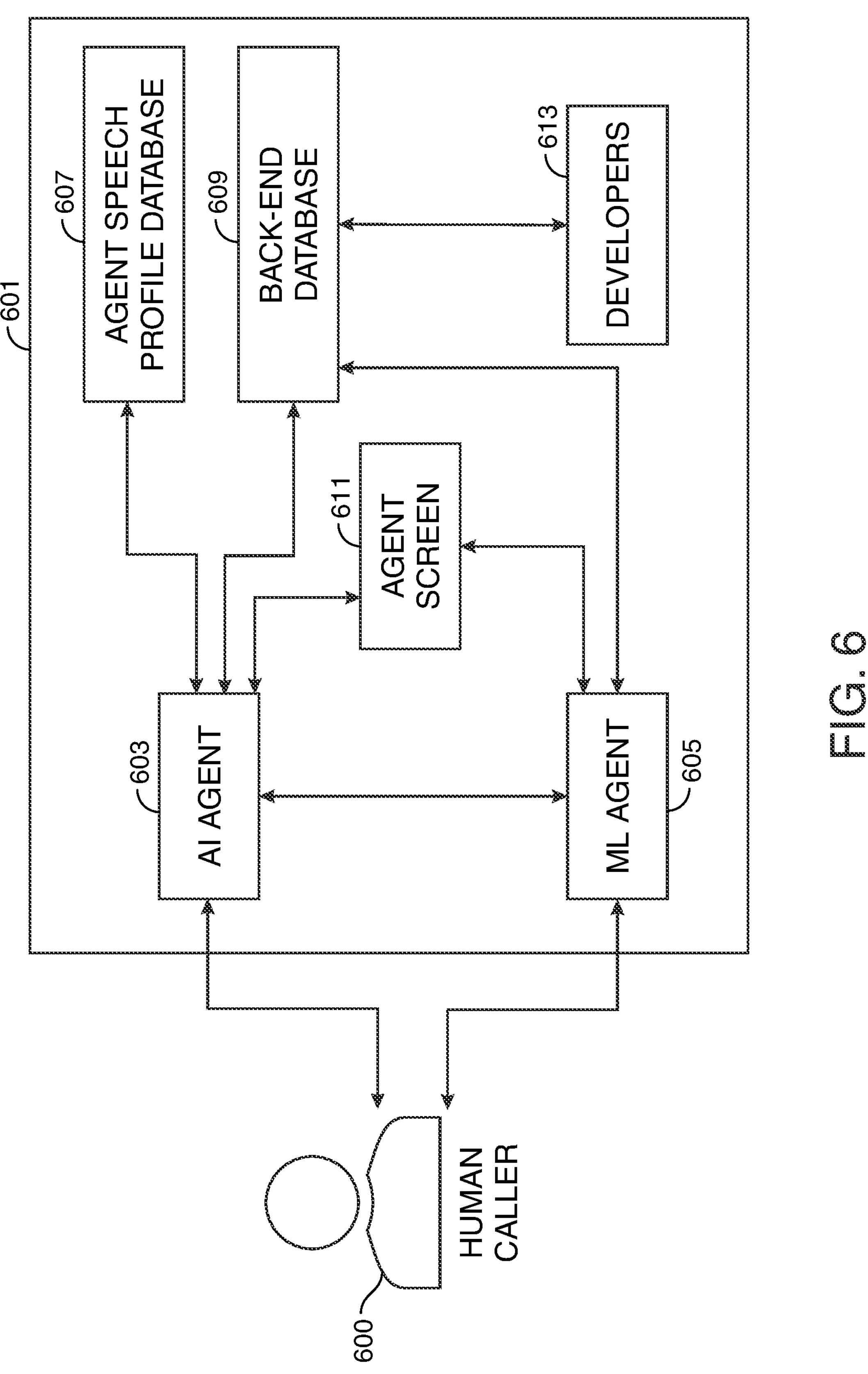
FIG. 6. shows an illustrative system in accordance with principles of the disclosure.

FIG. 6, shows an illustrative example of a system according to principles of the disclosure. Voice AI container 601 contains within it all the resources needed to respond to human caller 600. AI agent 603, ML agent 605, developers 613 and human agents (not shown) are all active or contained within the voice AI container 601. Agent speech profile database 607, backend database 609 and agent screen 611 are also contained within the voice AI container 601.

AI agent 603 receives a call from human caller 600 within the voice AI container 601. To respond to the human caller 600, the AI agent 603 may access backend database 609 to retrieve a valid mapping. The valid mapping may be loaded onto agent screen 611. The AI agent 603 may gather the information from the agent screen 611 and respond to the human caller 600. AI agent 603 may then update the backend database 609. AI agent 603 may transfer the call to ML agent 605. The AI agent 603 may retrieve an agent voice and speech profile from the agent speech profile database 607, to use when responding to human caller 600.

ML agent 605 may access backend database 609 to retrieve a valid mapping. The valid mapping may be loaded onto agent screen 611. The ML agent may gather the information from agent screen 611 and respond to human caller 600. The ML agent may update the backend database 609. The ML agent 605 may transfer the call back to the AI agent 603. The ML agent 605 may create a new valid mapping using the agent screen 611 and store the valid mapping in the backend database 609.

Developers 613 may be active within the voice AI container 601. The developers 613 may create new valid mappings and store them in backend database 609. The developers 613 may update the backend database 609. The developers 613 may create new valid mappings based on instruction from ML agent 605.

Thus, methods for VOICE AI CONTAINER have been provided. Persons skilled in the art will appreciate that the present invention can be practiced by other than the described embodiments, which are presented for purposes of illustration rather than of limitation, and that the present invention is limited only by the claims that follow.

What is claimed is:

1. A method for an artificial intelligence ("AI") agent answering a call within a voice AI container, the method comprising:

receiving, at the voice AI container in a first receiving step, the call from a human caller, the call comprising a query;

parsing, by the AI agent, the query to identify context associated with the query; identifying, by the AI agent in a first identifying step using the context, an intent of the query; and determining, by the AI agent in a first determining step, whether a first valid mapping stored within a backend database is associated with the intent of the query, the backend database being located within the voice AI container;

wherein the context comprises a content of the query and at least one of: a time the call was placed, a location from which the call was placed, and a history of previous calls placed; and wherein the first valid mapping comprises a set of steps taken to satisfy the intent of the query;

wherein:

there is a plurality of valid mappings stored in the backend database;

each of the plurality of valid mappings is associated with a respective one of a plurality of intents of the query;

each of the plurality of valid mappings are created by the following steps:

identifying, by a machine learning agent located within the voice AI container in a third identifying step, the respective one of the plurality of intents of the query;

navigating, by the machine learning agent in a second navigating step, an agent screen, located within the voice AI container, to gather information to satisfy the respective one of the plurality of intents of the query;

capturing agent screen navigation data during the second navigating step;

associating the agent screen navigation data with the respective one of the plurality of intents of the query;

creating, in a second creating step, a respective automated screen navigation script using the agent screen navigation data and an associated intent of the query;

creating, in a third creating step, a respective one of the plurality of valid mappings using the respective automated screen navigation script and the associated intent of the query; and storing the respective one of the plurality of valid mappings in the backend database.

2. The method of claim 1, further comprising the steps of:

receiving, by the AI agent in a second receiving step, the first valid mapping from the backend database; and loading, by the AI agent in a first loading step, the first valid mapping to an agent screen located within the voice AI container;

wherein:

the first valid mapping comprises a first automated screen navigation script; and the first loading step comprises loading the first automated screen navigation script on the agent screen and navigating, in a first navigating step, the agent screen using the first automated screen navigation script to gather information required to satisfy the intent of the query.

3. The method of claim 1, further comprising the steps of:

identifying, by the AI agent in a second identifying step, a human agent that is actively assigned to the voice AI container;

loading, in a second loading step, an agent voice and speech profile associated with the human agent from an agent speech profile database located in the voice AI container; and relaying, by the AI agent, using the agent voice and speech profile associated with the human agent, the information to the human caller.

4. The method of claim 3, wherein the agent voice and speech profile is created by the following steps:

recording voice samples from the human agent;

sending the voice samples to a voice cloning software;

creating, in a first creating step, using the voice cloning software, the agent voice and speech profile;

associating the agent voice and speech profile with the human agent; and storing the agent voice and speech profile in the agent speech profile database.

5. The method of claim 1 wherein the context further comprises grammar and syntax of the query, a language which was used by the human caller, a pace that the human caller was speaking, an amount of words the human caller used for the query and a tone of the human caller.

6. The method of claim 2, further comprising the steps of:

updating the backend database to associate the query with the context and the first valid mapping.

7. A method for an artificial intelligence ("AI") agent answering a call within a voice AI container, the method comprising:

receiving, at the voice AI container in a first receiving step, the call from a human caller, the call comprising a query;

parsing, by the AI agent, the query to identify context associated with the query; identifying, by the AI agent in a first identifying step using the context, an intent of the query; and determining, by the AI agent in a first determining step, absence of a first valid mapping associated with the intent of the query, the absence being limited to any location within a backend database, the backend database being located within the voice AI container;

wherein the context comprises a content of the query and at least one of: a time the call was placed, a location from which the call was placed, and a history of previous calls placed;

wherein the first valid mapping comprises a set of steps taken to satisfy the intent of the query;

identifying, by the AI agent in a second identifying step, a machine learning agent that is actively assigned to the voice AI container;

passing, by the AI agent, control of the call to the machine learning agent; and the machine learning agent responding, in a first responding step, to the human caller.

8. The method of claim 7, wherein:

the first responding step comprises the machine learning agent, using the intent of the query identified in the first identifying step, determining, in a second determining step, whether a second valid mapping stored in the backend database is associated with the intent of the query; and upon the determination, in the second determining step, that the second valid mapping is associated with the intent of the query the machine learning agent passes the call back to the AI agent with the second valid mapping.

9. The method of claim 8, wherein after the call is passed back to the AI agent, the first responding step further comprises the steps of:

updating the backend database to associate the query, context and intent of the query with the second valid mapping;

receiving, by the AI agent in a second receiving step, the second valid mapping from the backend database;

loading, by the AI agent in a first loading step, the second valid mapping to an agent screen located within the voice AI container wherein the second valid mapping comprises a first automated screen navigation script and wherein the first loading step comprises loading the first automated screen navigation script on the agent screen and navigating, in a first navigating step, the agent screen using the first automated screen navigation script to gather information required to satisfy the intent of the query;

identifying, by the AI agent in a third identifying step, a human agent that is actively assigned to the voice AI container;

loading, in a second loading step, an agent voice and speech profile associated with a human agent assigned to the voice AI container from an agent speech profile database located within the voice AI container; and relaying, by the AI agent using the agent voice and speech profile in a first relaying step, the information to the human caller.

10. The method of claim 7, wherein the context further comprises grammar and syntax of the query, a language used by the human caller, a pace that the human caller was speaking, an amount of words the human caller used and a tone of the human caller.

11. The method of claim 7, wherein the first responding step comprises the steps of:

navigating, by the machine learning agent in a second navigating step, an agent screen located within the voice AI container to gather information required to satisfy the intent of the query identified in the first identifying step; and relaying, by the machine learning agent in a second relaying step, the information to the human caller.

12. The method of claim 11 wherein:

agent screen navigation data is captured during the second navigating step;

the agent screen navigation data is associated with the intent of the query;

the agent screen navigation data and the associated intent of the query are used to create a second automated screen navigation script;

a third valid mapping, using the second automated screen navigation script and the associated intent of the query, is created and stored in the backend database; and the backend database is updated to associate the query, the context and the intent of the query with the third valid mapping.

13. The method of claim 10, wherein an agent voice and speech profile is created by the following steps:

recording voice samples from a human agent;

sending, in a second sending step, the voice samples to a voice cloning software;

creating, in a first creating step, using the voice cloning software, the agent voice and speech profile;

associating the agent voice and speech profile with the human agent; and storing the agent voice and speech profile in an agent speech profile database.

14. The method of claim 7, wherein:

there is a plurality of valid mappings stored in the backend database; and each of the plurality of valid mappings is associated with a respective one of a plurality of intents of the query.

15. The method of claim 14, wherein each of the plurality of valid mappings are created by the following steps:

identifying, in a fourth identifying step by a machine learning agent located within the voice AI container, the respective one of the plurality of intents of the query;

navigating, in a fourth navigating step by the machine learning agent, an agent screen, located within the voice AI container, to gather information to satisfy the respective one of the plurality of intents of the query;

capturing agent screen navigation data during a second navigating step;

associating the agent screen navigation data with the respective one of the plurality of intents of the query;

creating, in a second creating step, a respective automated screen navigation script using the agent screen navigation data and an associated intent of the query;

creating, in a third creating step, a respective one of the plurality of valid mappings using the respective automated screen navigation script and the associated intent of the query; and storing the respective one of the plurality of valid mappings in the backend database.

16. A method for an artificial intelligence ("AI") agent answering a call within a voice AI container, the method comprising:

receiving, at the voice AI container in a first receiving step, the call from a human caller, the call comprising a query;

parsing, by the AI agent, the query to identify context associated with the query; identifying, by the AI agent in a first identifying step using the context, an intent of the query;

determining, by the AI agent in a first determining step, whether a first valid mapping stored within a backend database is associated with the intent of the query, the backend database being located within the voice AI container;

receiving, by the AI agent in a second receiving step, the first valid mapping from the backend database;

loading, by the AI agent in a first loading step, the first valid mapping to an agent screen located within the voice AI container;

wherein:

the first valid mapping comprises a first automated screen navigation script; and the first loading step comprises loading the first automated screen navigation script on the agent screen and navigating, in a first navigating step, the agent screen using the first automated screen navigation script to gather information required to respond to the intent of the query;

identifying, by the AI agent in a second identifying step, a human agent that is actively assigned to the voice AI container;

loading, in a second loading step, an agent voice and speech profile associated with the human agent from an agent speech profile database located in the voice AI container; and relaying, by the AI agent, using the agent voice and speech profile associated with the human agent, the information to the human caller;

wherein the context comprises a content of the query and at least one of: a time the call was placed, a location from which the call was placed, a history of previous calls placed, grammar and syntax of the query, a language which was used by the human caller, a pace that the human caller was speaking, an amount of words the human caller used for the query and a tone of the human caller; and wherein the first valid mapping comprises a set of steps taken to respond to the intent of the query.

* * * * *